J. E. LEDERMAN.
ENVELOP SEALING AND STAMPING MACHINE.
APPLICATION FILED OCT. 2, 1911.

1,047,664.

Patented Dec. 17, 1912.

Witnesses.
Edward T. Wray.
Minnie M. Lindeman

Inventor
John E. Lederman,
by Parker Cook
Attorneys

J. E. LEDERMAN.
ENVELOP SEALING AND STAMPING MACHINE.
APPLICATION FILED OCT. 2, 1911.

1,047,664.

Patented Dec. 17, 1912.
7 SHEETS—SHEET 4.

Fig. 4.

Witnesses
Edward T. Wray.

Inventor.
John E. Lederman.
by Parker
Attorneys.

J. E. LEDERMAN.
ENVELOP SEALING AND STAMPING MACHINE.
APPLICATION FILED OCT. 2, 1911.

1,047,664.

Patented Dec. 17, 1912.
7 SHEETS—SHEET 6.

Witnesses:
Edward T. Wray
Minnie M. Lindeman

Inventor
John E. Lederman
by Parker & Parker
Attorneys

J. E. LEDERMAN.
ENVELOP SEALING AND STAMPING MACHINE.
APPLICATION FILED OCT. 2, 1911.

1,047,664.

Patented Dec. 17, 1912.
7 SHEETS—SHEET 7.

UNITED STATES PATENT OFFICE.

JOHN E. LEDERMAN, OF CHICAGO, ILLINOIS, ASSIGNOR TO SECURITY SEALING & STAMPING MACHINE COMPANY, OF CHICAGO, ILLINOIS, A CORPORATION OF ILLINOIS.

ENVELOP SEALING AND STAMPING MACHINE.

1,047,664. Specification of Letters Patent. Patented Dec. 17, 1912.

Application filed October 2, 1911. Serial No. 652,229.

*To all whom it may concern:*

Be it known that I, JOHN E. LEDERMAN, a citizen of the United States, residing at Chicago, in the county of Cook and State of Illinois, have invented a certain new and useful Improvement in Envelop Sealing and Stamping Machines, of which the following is a specification.

My invention relates to improvements in envelop sealing and stamping machines and is illustrated diagrammatically in one form in the accompanying drawings, wherein—

Like letters refer to like parts throughout the several drawings.

Figure 1:
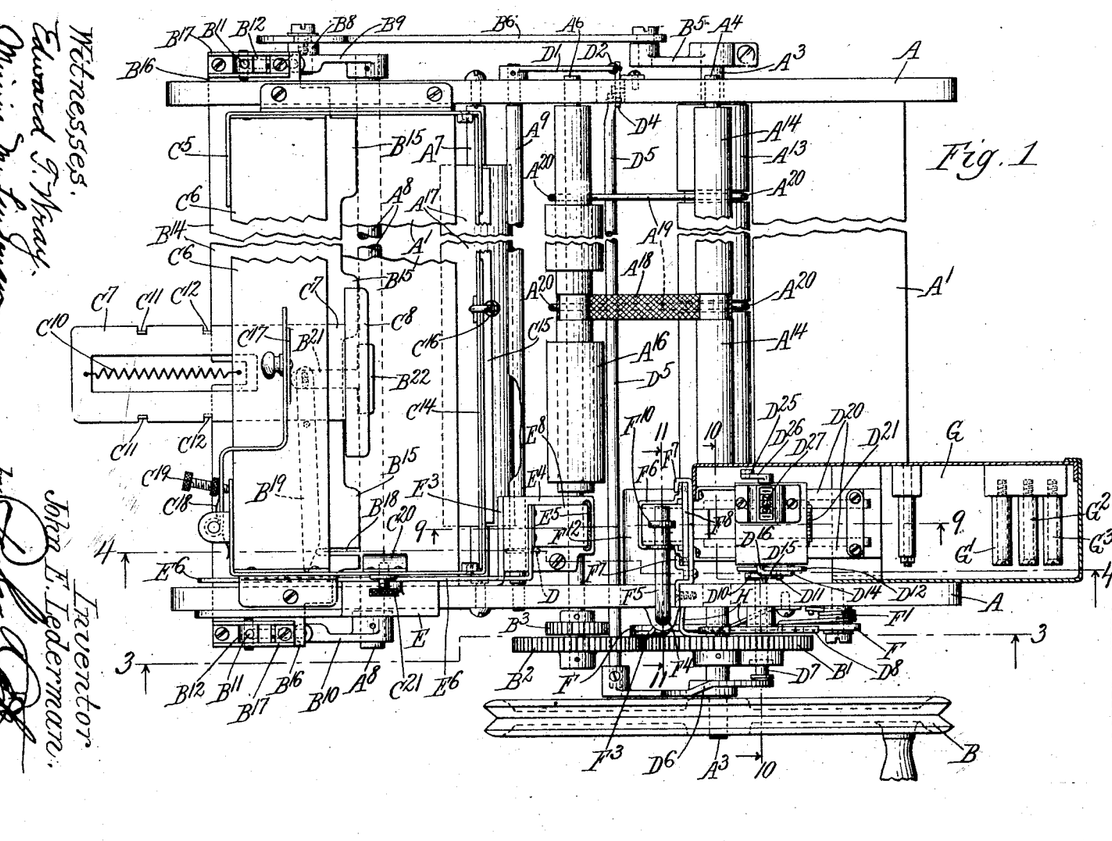
Figure 1 is a plan view of the device in part section.
Figure 2:
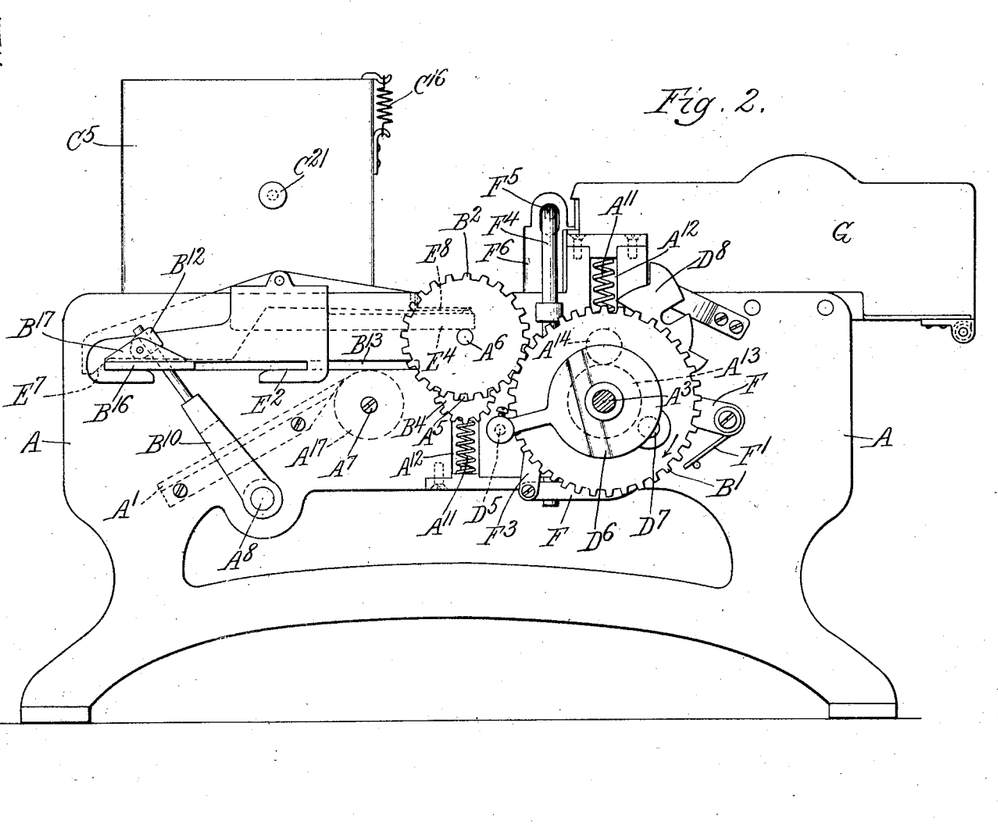
Fig. 2 is a side elevation, the crank being broken away.
Figure 3:
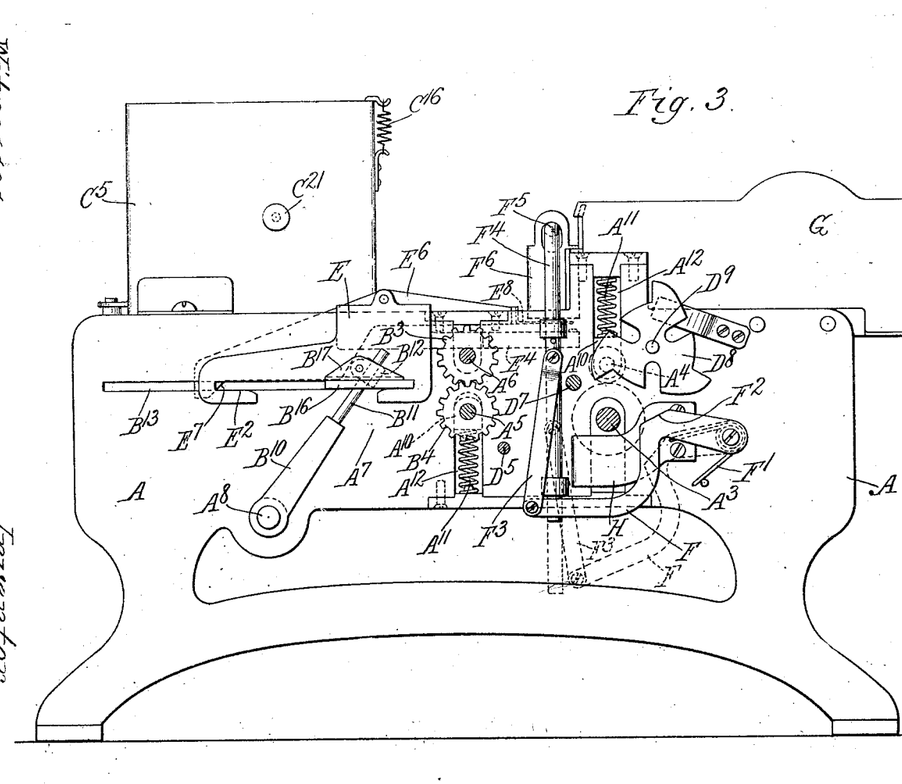
Fig. 3 is a section on the line 3—3 of Fig. 1.
Figure 4:
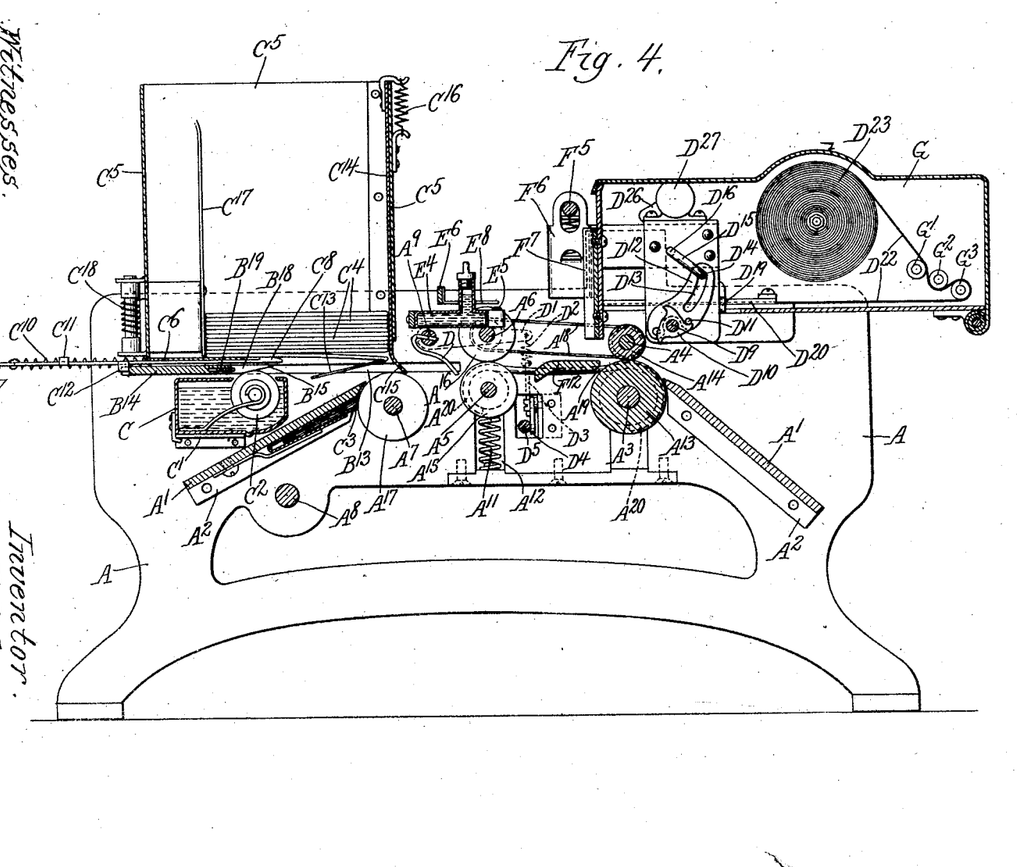
Fig. 4 is a section on the line 4—4 of Fig. 1.
Figures 5, 6, 7, 8:
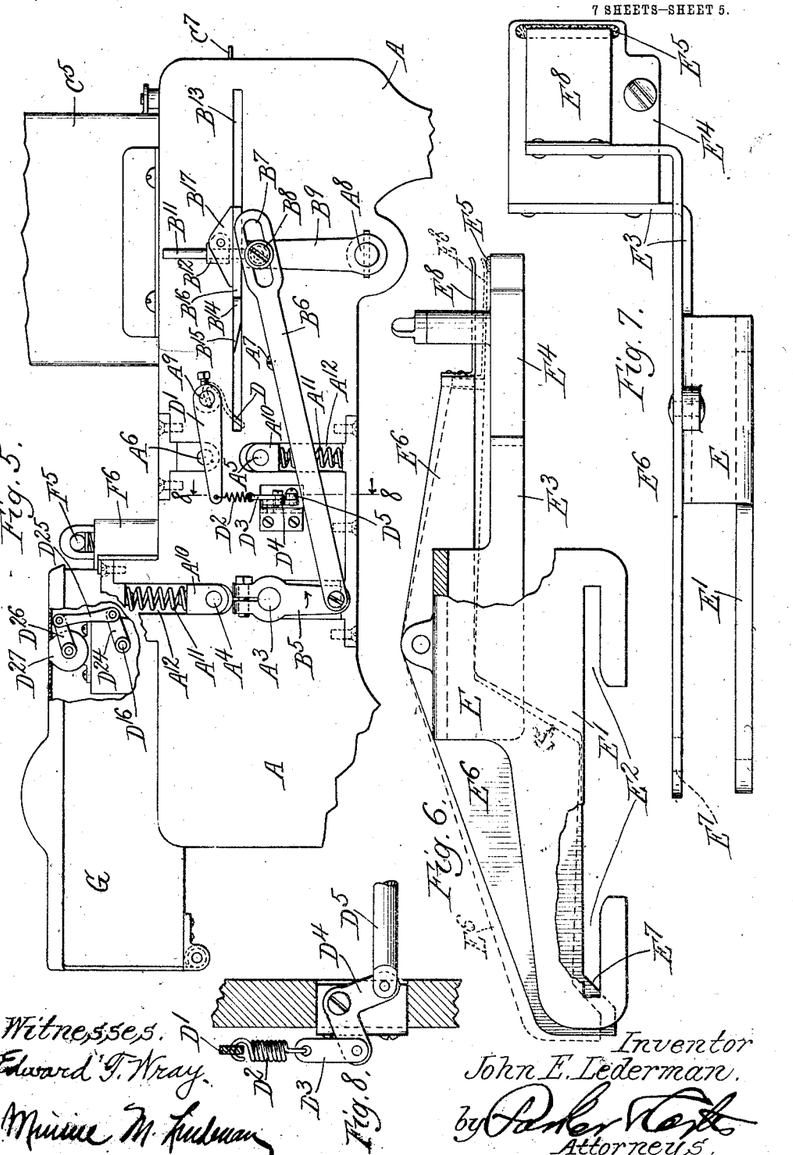
Fig. 5 is a side elevation on the side opposite that shown in Fig. 2.
Fig. 6 is a detailed side elevation of the stamp moistening device.
Fig. 7 is a plan view of the stamp moistening device.
Fig. 8 is a detailed section along the line 8—8 of Fig. 5.
Figure 9:
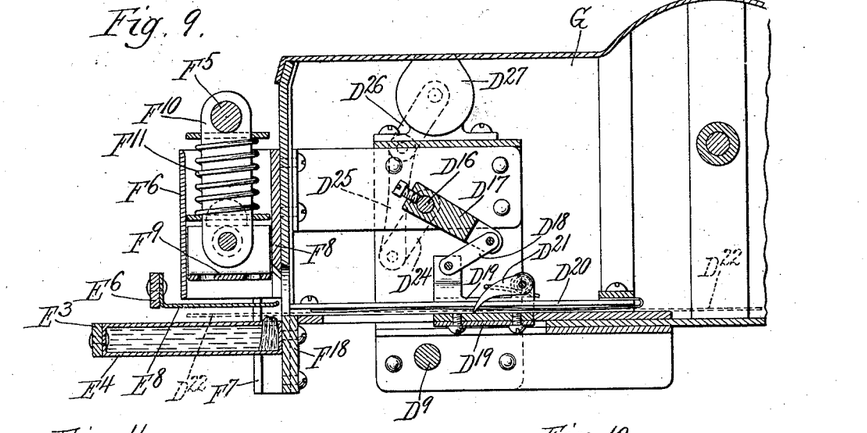
Fig. 9 is a detailed section along the line 9—9 of Fig. 1.
Figures 10, 11:
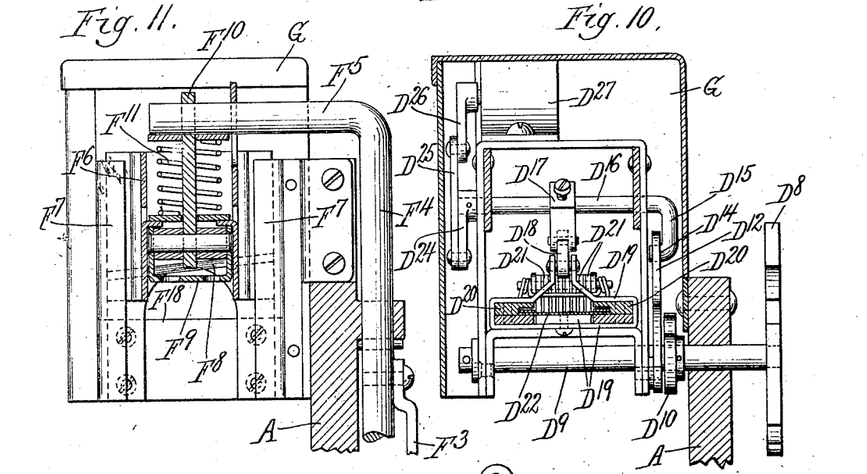
Fig. 10 is a detailed section along the line 10—10 of Fig. 1.
Fig. 11 is a detailed section along the line 11—11 of Fig. 1.
Figure 12:
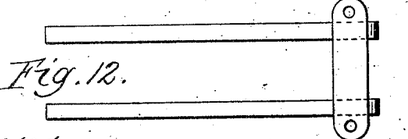
Fig. 12 is a detailed plan view of the stamp guiding fingers.
Figure 13:
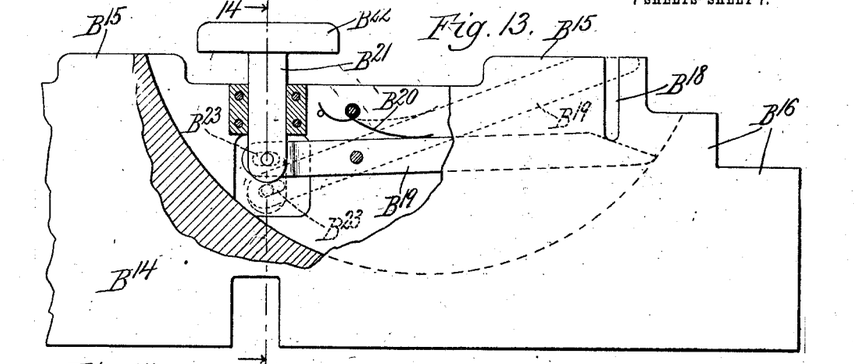
Fig. 13 is a detailed plan view of the envelop feed plate.
Figures 14, 15, 16, 18:
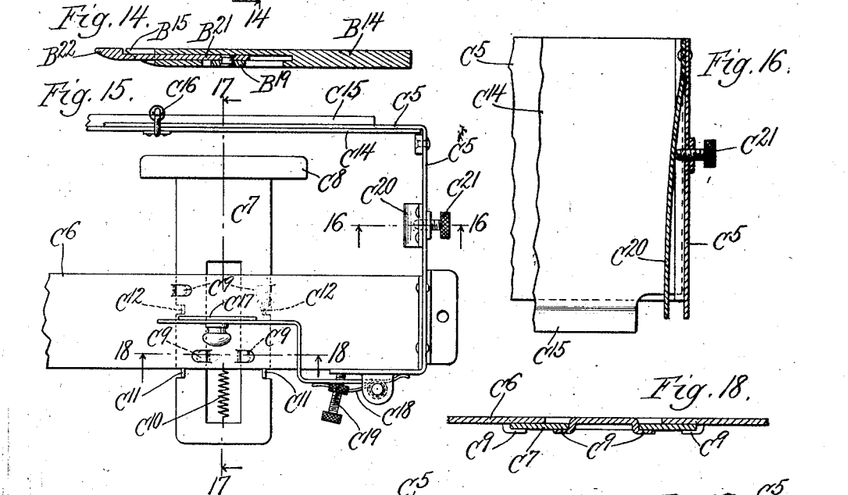
Fig. 14 is a section along line 14—14 of Fig. 13.
Fig. 15 is a plan view of one end of the envelop hopper.
Fig. 16 is a section along line 16—16 of Fig. 15.
Fig. 18 is a section along line 18—18 of Fig. 15.
Figure 17:
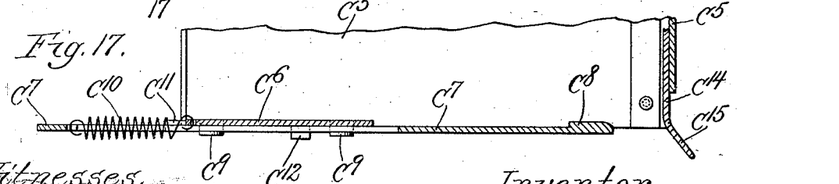
Fig. 17 is a section along line 17—17 of Fig. 15.

The side frames A are coupled together by the inclined cross members $A^1$ having at either end the downwardly bent flanges $A^2$ bolted to the frame. The rotating drive shaft $A^3$ and the driven shafts $A^4$, $A^5$, $A^6$ and $A^7$ and the rock shafts $A^8$ and $A^9$ are journaled in bearings in the frames A, the bearings for the shafts $A^4$ and $A^5$ being carried in the sliding blocks $A^{10}$ supported by the springs $A^{11}$ in the slots $A^{12}$. The shafts $A^3$, $A^4$, $A^5$, $A^6$ and $A^7$ carry respectively the elastic rollers $A^{13}$, $A^{14}$, $A^{15}$, $A^{16}$ and $A^{17}$, the rollers $A^{13}$, $A^{14}$ and $A^{15}$, $A^{16}$ being held in close contact one with the other by the springs $A^{11}$. The rollers $A^{14}$ and $A^{16}$ are connected by the guide belt $A^{18}$ which passes over the roller $A^{14}$ and over reduced portion of the roller $A^{16}$. The rollers $A^{13}$ and $A^{15}$ carry the downwardly bent spring guides $A^{19}$ provided at either end with the curved segments $A^{20}$ engaging reduced portions of the rollers and being located at all points substantially below the highest portion of the roller. The drive shaft $A^3$ which is driven by means of the pulley B from any suitable source of power not shown, carries the gear $B^1$ in mesh with the gear $B^2$ on the shaft $A^6$. The gear $B^3$ on the shaft $A^6$ is in mesh with the gear $B^4$ on the shaft $A^5$, the arrangement being such that when the drive shaft is rotated the rollers $A^3$, $A^4$, $A^5$ and $A^6$ are rotated in unison and in pairs in opposite directions. The shaft $A^3$ is provided at its opposed end with the crank $B^5$ and connecting rod $B^6$ which has at its other end the slot $B^7$ in which is rigidly and adjustably mounted the bearing block $B^8$, pivotally mounted on the crank $B^9$ on the end of the rock shaft $A^8$. The cranks $B^9$ and $B^{10}$ are each provided at one end with the extension or rod $B^{11}$ upon which are slidably and rigidly mounted the bearing blocks $B^{12}$.

The frames A are provided each with the registering horizontally disposed slots $B^{13}$ in which reciprocates the envelop feed plate $B^{14}$, having the upwardly inclined sharpened front edge $B^{15}$ and on either end the slot engaging projections $B^{16}$ terminating in the upwardly extended lugs $B^{17}$ in pivotal engagement with the bearing blocks $B^{12}$ to provide a driving connection between the feed plate $B^{14}$ and the drive shaft $A^3$. The plate $B^{14}$ is provided adjacent one end with the slot $B^{18}$. The lever $B^{19}$ is pivotally mounted on the plate $B^{14}$ and is adapted to oscillate so as to close the slot $B^{18}$, being held, however, out of engagement with the slot by the spring $B^{20}$. The rod $B^{21}$ is slidably mounted on the plate $B^{14}$ and is provided with the envelop contacting T-head $B^{22}$ projecting forward beyond the edge $B^{15}$ and is in pivotal engagement with the slot $B^{23}$ in the end of the lever $B^{19}$.

The envelop moistening reservoir C, which is slidably mounted on the angles $C^1$ on the frames A contains the spring-held roll $C^2$ in opposition to the plate $B^{14}$ to moisten the plate. The pad $C^3$ is mounted upon the crosspiece $A^1$ and in opposition to the roller $A^{17}$ to scrape off or absorb from its surface any moisture which may be left there by the passage of the envelop $C^4$ as it is fed forward by the plate $B^{14}$ to the rollers $A^{15}$, $A^{16}$. The envelop hopper $C^5$ is rigidly attached to the frames A and provided with the fixed rearwardly extending half-bottom $C^6$. The plate $C^7$ having at its forward edge the laterally disposed T-head $C^8$, is slidably mounted upon the bottom $C^6$ above the plate $B^{14}$ being held in position thereon by the lugs $C^9$. The spring $C^{10}$ attached at one end to the plate $C^7$ and at the other end to the plate $C^6$, is adapted to hold the plate $C^7$ in the forward position beneath the pile of envelops, thus supporting them. The upwardly extending lugs $C^{11}$ limit the forward excursion of the plate $C^7$, the downwardly extending lugs $C^{12}$ extending into the path of the plate $B^{14}$ in such wise that as the plate $B^{14}$ retards from the rollers $A^{15}$, $A^{16}$ it carries the plate $C^7$ with it, permitting the flap $C^{13}$ of the bottom envelop $C^4$ in the pile to drop down into the path of the feed plate $B^{14}$. The plate $C^{14}$ is slidably mounted within the hopper $C^5$ as the outwardly curved portion $C^{15}$ in opposition to the roller $A^{17}$ is held against the roller by the spring $C^{16}$, which is adapted to yield to permit the plate $C^{14}$ to ride up as the feed plate $B^{14}$ travels toward the rollers $A^{15}$ $A^{16}$. The pivotally mounted guide $C^{17}$ contacts the back of the pile of envelops and holds them against the plate or apron $C^{14}$. The spring $C^{18}$ is adjustable by means of the thumb screw $C^{19}$ to vary the pressure exerted by this guide against the envelops. The hopper $C^5$ is provided on the driving side of the machine with the false spring side $C^{20}$ adjustable in position by the thumb screw $C^{21}$ whereby the position of the envelops with respect to the stamp affixing mechanism subsequently to be described may be controlled. The rocker shaft $A^9$ carries the pin or lever D projecting downwardly into the path of the feed plate $B^{14}$ and adapted to enter the slot $B^{18}$ or contact the end of the lever $B^{19}$ as the case may be. The lever $D^1$ on the end of the rocker shaft $A^9$ is connected by means of the spring $D^2$ and link $D^3$ with one end of the bell crank lever $D^4$ to the other end of which is connected the sliding rod $D^5$ which carries at its other end the flat cam $D^6$. The pin $D^7$ is slidably mounted in the gear $B^1$ in opposition at one end to the cam $D^6$ and may be caused by it to project from the inner side of the gear $B^1$ into the path of the star wheel $D^8$ which is mounted upon the shaft $D^9$. The shaft $D^9$ carries the star wheel $D^{10}$ in opposition to the pin $D^{11}$. The lever $D^{12}$ is provided with the curved slot $D^{13}$ in which is slidably mounted the pin $D^{14}$ projecting inwardly from the rocker arm $D^{15}$. The rocker shaft $D^{16}$ is driven by the rocker arm $D^{15}$ and carries the lever $D^{17}$ connected by means of the link $D^{18}$ with the stamp feeding carriage $D^{19}$ reciprocating upon the stamp guiding tracks $D^{20}$ and carrying the downwardly pressed spring held, stamp perforation engaging fingers $D^{21}$. The stamps $D^{22}$ are fed from the reel $D^{23}$ through the stamp guides into the path of the stamp feeding fingers.

The carriage E is slidably mounted upon one of the frames A, is provided with the downwardly extending flange $E^1$ having the T shaped slot $E^2$ in the path of the slot engaging projections $B^{16}$ on the feed plate $B^{14}$. The arm $E^3$ projects forwardly from the carriage E and carries the reservoir $E^4$ having the stamp moistening pad $E^5$ on the upper surface thereof. The arm $E^6$ is pivotally mounted upon the carriage E, provided at one end with the inclined trigger surface $E^7$ adapted to be engaged by the plate $B^{14}$ during its return movement away from the feed rolls and carries at the other end the stamp engaging spring leaf $E^8$ in opposition to the pad $E^5$.

The lever $D^{24}$ is carried by the rocker shaft $D^{16}$ and operates by means of the link $D^{25}$ and lever arm $D^{26}$ the counting mechanism $D^{27}$. The lever F pivotally mounted upon the frame A is held in a raised position by the spring $F^1$, is provided with the cam surface $F^2$ in the path of the pin $D^7$ and is connected by means of the link $F^3$ with the sliding rod $F^4$ having at its upper end the cross arm $F^5$.

The carriage $F^6$ which is slidably mounted in the vertical guides $F^7$, has along one side the stamp cutting knife $F^8$ in opposition to the end of the stamp guide $F^{18}$ and contains slidably mounted therein the perforate stamp presser foot or plunger $F^9$. The foot $F^9$ is provided with the upwardly extending link $F^{10}$ in which is slidably mounted the lever $F^5$. The spring $F^{11}$ is interposed between the lever $F^5$ and the carriage $F^6$ in such manner that the stamp is first cut off by the knife on the carriage and then conveyed down to the envelop. At the end of the carriage's excursion the presser foot comes down and presses the stamp against the envelop which at that time rests upon the anvil $F^{12}$ below the normal path of the envelop.

The housing G which contains the stamp feeding mechanism and the stamp reel $D^{23}$, the counting mechanism and the stamp reel together with the stamp guides is pivotally mounted upon the machine and contains the three spaced rollers $G^1$, $G^2$, and $G^3$ between which the stamps are drawn in reverse direction to take out the curl imparted to them by their storage in the roll form.

The cam H which is rigidly attached to the main frame in the path of the pin $D^7$ is adapted to force it into the inoperative position as it is carried around after it has operated the stamping mechanism.

It will be evident that while I have shown in my drawings an operative device, still many changes might be made in size, shape and arrangement of parts without departing materially from the spirit of my invention and I wish therefore, that my drawings be regarded as in a sense diagrammatic.

The use and operation of my invention are as follows: The envelops are placed in the envelop hopper back down, that is with the flap on the down side in such manner that the top edge of the envelop faces the feed rollers. The machine is then started, the rollers rotate and the crank on the drive shaft reciprocates the envelop feeding plate. This plate feeds forward over the moistening roller and engages the inside of the flap of the envelop; it then feeds forward past the downwardly depending apron in the envelop hopper, raising it to permit the passage of a single envelop. The false or movable bottom in the hopper comes forward with the envelop feed plate, thus holding the column of envelops stiff, preventing their sagging down. This prevents the flap on the next to the last envelop in the pile from catching any obstructions or perforations in the bottom envelop. The envelop is fed over the large idler roll upon which the apron rests and the pressure of the apron on the envelop and roll brings the flap up against the moistened feed strip, thus moistening the flap. The feed strip goes on until the envelop is inserted between the first feed roll, when it withdraws, allowing the envelop to be fed through the machine by the feed rolls. Meanwhile, however, the slidable T-head projections at the front edge of the envelop feed plate will have engaged the back of the flap of the envelop and have been pushed back until it is in line with the front of the envelop feed plate. This operates the lever to close the slot in the feed plate and the closure of this slot brings an obstruction into the path of the lever on the stamp feeding rocker shaft. This rocks the shaft and throws the clutch, thus connecting the stamp affixing mechanism with the driving mechanism. As the envelop passes through the machine, the forward excursion of the envelop feed plate carries forward with it the stamp moistener and feeder until the moistening mechanism lies beneath the last stamp on the stamp strip. The return movement of the envelop feeding plate operates the lever on the stamp moistening carriage, which lever presses against the top of the stamp and presses it down against the moistening pad on the moistener, thus moistening the bottom of the stamp. The stamp cutting and affixing mechanism then operates responsive to the driving means and cuts off the stamp, subsequently pressing it down against the envelop. The cutter and presser then flies up and permits the next stamp to be fed forward by the reciprocating fingers which engage the stamp perforations. The envelop then feeds past the last two feeding and pressing rolls, whereby the stamp is firmly pressed against the envelop and the flap is again firmly pressed for sealing. The downwardly curved guide bars below the top of the lower rolls are merely provided to prevent any buckling or bending of the envelop in case thin light envelops might be used with heavy objects in them such as would cause them to bend downward. The feed and guide belt on the two upper rolls prevents envelops buckling upwardly. It will be observed that only when the machine is operating to feed envelops through will the stamps be cut off since only when an envelop is being carried by the envelop feed plate will the slots in the plate outside the path of the envelop be closed to cause the plate to strike the rocker arm on the stamp feed rocker shaft to throw the stamp feed clutch. By this means it is possible to lock the stamp feed case and stamps may not be stolen from this case since the only way to get them out is by feeding the envelops through the machine.

I claim:

1. In an envelop stamping mechanism a hopper and means responsive to the presence of envelops therein for throwing the stamp feed into operation.

2. In an envelop stamping mechanism means responsive to the presence of an envelop but operative before any part of it commences its passage through the machine for throwing the stamp feed into operation.

3. In an envelop stamping mechanism a hopper and means responsive to the presence of envelops therein for throwing the stamp feed into operation, said means comprising a feeler in opposition to one of the envelops.

4. In an envelop stamping mechanism means responsive to the presence of an envelop but operative before any part of it commences its passage through the machine for throwing the stamp feed into operation, said means comprising a feeler in opposition to one of the envelops.

5. In an envelop stamping mechanism having an envelop feed plate means operative by said plate for throwing the stamp feed into operation.

6. In an envelop stamping mechanism having an envelop feed plate means operative by said plate and responsive to the presence of an envelop for throwing the stamp feed into operation.

7. In an envelop stamping mechanism having an envelop feeding plate, an envelop feeler carried by said plate for throwing the stamp feed into operation.

8. In an envelop stamping mechanism an envelop feed plate, a rocker arm and a stamp feed mechanism, an envelop feeler carried by said plate and means carried by said plate and responsive to said feeler for actuating the rocker arm to throw the stamp feed mechanism into operation.

9. In an envelop stamping mechanism an envelop feed plate, a stamp feed controlling rocker bar and means carried by said plate and projecting to one side of the envelops for actuating said bar and stamp feeding means actuated by said rocker bar.

10. In an envelop stamping mechanism an envelop feed plate, a slot therein, an envelop feeler carried thereby and means actuated by said feeler for closing said slot to throw the stamp feed into operation in response to the movement of said plate.

11. In an envelop stamping mechanism an envelop feed plate, a slot therein, an envelop feeler carried thereby and means actuated by said feeler for closing said slot to throw the stamp feed into operation in response to the movement of said plate, said means comprising a lever pivotally mounted on said plate linked at one end to the feeler and in opposition at the other end to the slot.

12. In an envelop stamping mechanism means comprising an envelop feed plate, a slot therein, a rocker arm in opposition to said slot and envelop actuated means for closing said slot to throw the stamp feed into operation.

13. In an envelop stamping mechanism means comprising an envelop feed plate, a slot therein, a rocker arm in opposition to said slot and envelop actuated means for closing said slot to throw the stamp feed into operation, said closing means comprising a lever pivotally mounted on the feed plate, an envelop feeler carried by the plate and linked to the lever and a rocker arm contacting surface carried by said lever in opposition to said slot.

14. In a stamp affixing mechanism a horizontally movable, vertically immovable stamp moistening reservoir and pad, means for pressing stamps against said pad and for drawing the pad across the glued surface of the stamps.

15. In a stamp affixing mechanism having an envelop feed bar, a stamp moistening reservoir and pad reciprocating in response to the reciprocation of the bar and means for pressing the stamps against said pad, said means operative in response to the reciprocation of the envelop feeding bar.

16. In an envelop stamping machine a reciprocating envelop feed plate, a slidably mounted carriage, stamp moistening means thereon, said carriage reciprocating in response to the feed plate and means responsive to the feed plate for operating the moistening device.

17. In an envelop stamping machine a reciprocating feed plate, a slidably mounted carriage, stamp moistening means thereon, said carriage reciprocating in response to the feed plate and means responsive to the feed plate for operating the moistening device, said means comprising a stamp contacting leaf and a lever on said carriage in opposition to said feed plate.

18. In a stamp affixing mechanism a horizontally movable vertically immovable stamp-moistening reservoir, a support therefor, a pad carried thereby in fixed relation thereto and yielding means carried by said support for pressing the stamps against said pad.

19. In a stamp affixing mechanism a horizontally movable vertically immovable stamp-moistening reservoir, a pad carried thereby in fixed relation thereto, a carriage for said reservoir and a stamp engaging spring leaf carried by said reservoir in opposition to the pad.

20. In a stamp affixing mechanism a horizontally movable vertically immovable stamp-moistening reservoir, a pad carried thereby in fixed relation thereto, a carriage for said reservoir and a stamp engaging spring leaf carried by said reservoir in opposition to the pad, means for reciprocating the said carriage and means operative in unison with said reciprocating means for alternately pressing said leaf against the pad and withdrawing it therefrom.

JOHN E. LEDERMAN.

Witnesses:
FRANCIS W. PARKER, Jr.,
MINNIE M. LINDENAN.